May 22, 1956     H. F. LONNMAN     2,746,194
VIEWING AND FISHING DEVICE
Filed March 28, 1955     2 Sheets-Sheet 1
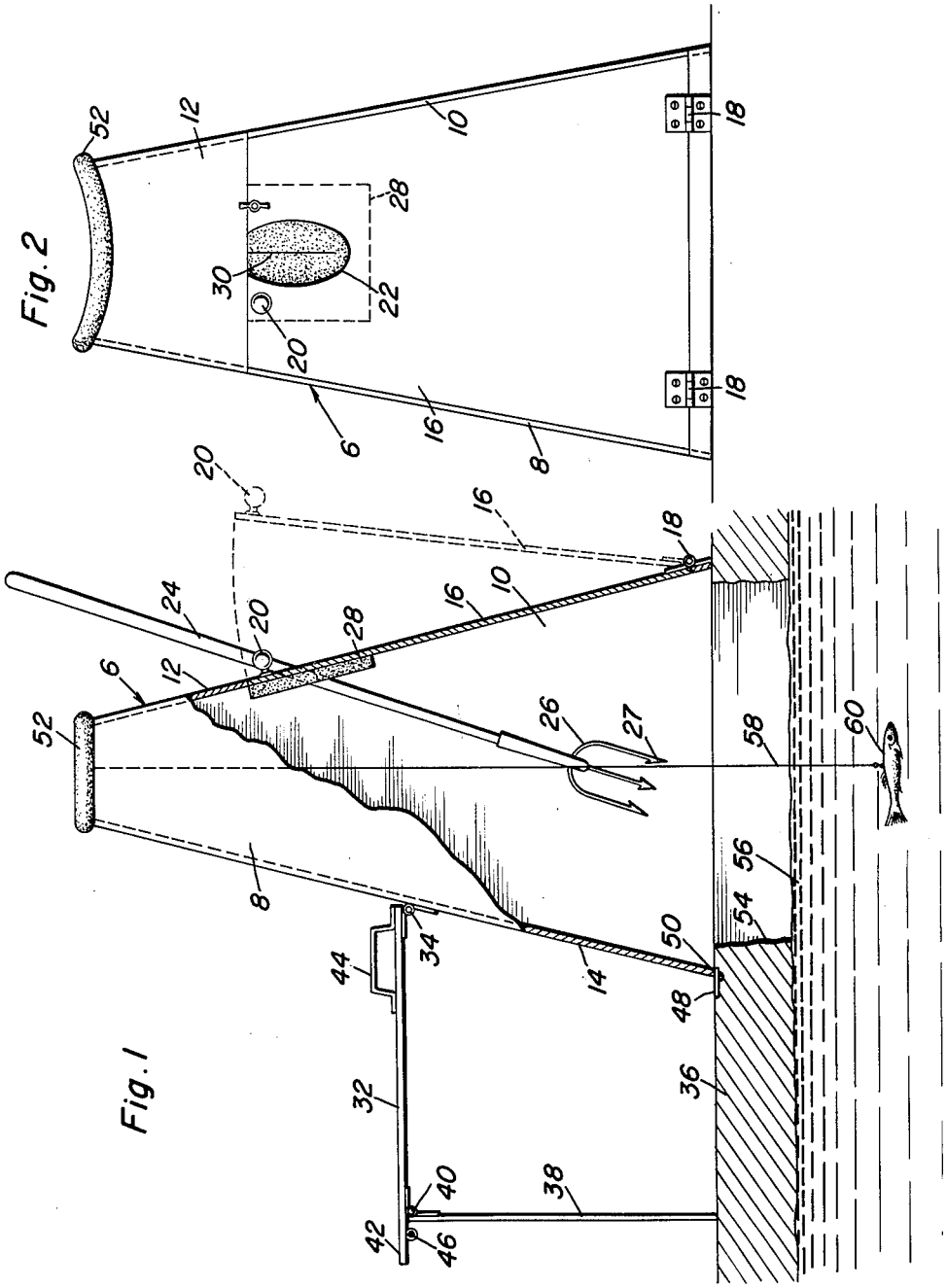
Horace F. Lonnman
INVENTOR.

May 22, 1956  H. F. LONNMAN  2,746,194
VIEWING AND FISHING DEVICE
Filed March 28, 1955  2 Sheets-Sheet 2
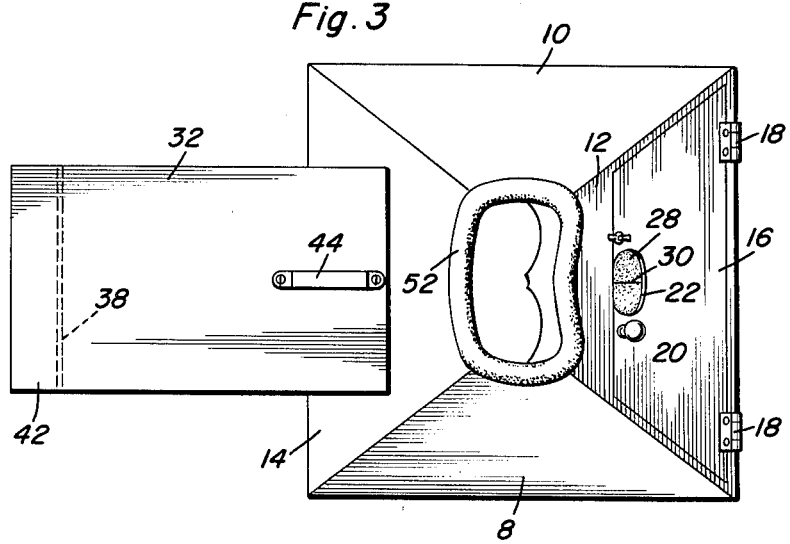
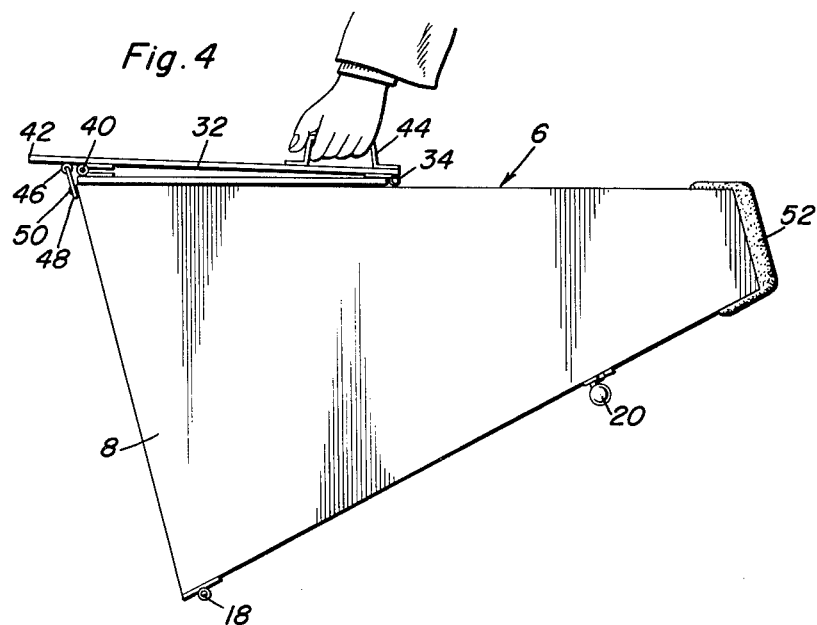
Horace F. Lonnman
INVENTOR.

United States Patent Office 2,746,194
Patented May 22, 1956

2,746,194
VIEWING AND FISHING DEVICE
Horace F. Lonnman, Dixie Lake, Mich.

Application March 28, 1955, Serial No. 497,214

10 Claims. (Cl. 43—1)

The present invention relates to an improved portable device which is expressly designed to assist a fisherman in catching fish and although it may be used on a wharf or perhaps even in a boat, it is intended for ice fishing.

It is, therefore, the primary object of the invention to provide a simple, practical, light weight, inexpensive device for viewing ice covered water through a hole therein and which, in practice, is positioned atop the ice in a manner to encompass the usual hole in the ice so that it rises perpendicularly from the ice in alignment with said hole, permits downward passage of the baited fishing line therethrough and enables the viewer to observe the under-ice fishing conditions and requirements and enables him, with desired diligence, to watchfully observe varying conditions and be suitably alerted to land an intended catch.

In carrying out a preferred embodiment of the invention, a non-transparent tapering shield is provided. This is preferably a truncated pyramidal shield of appropriate vertical height and which is open at its lower basal end and also at its upper apical or restricted end. The basal end is adapted to encompass the hole and rest firmly atop the ice surrounding and in alignment with the hole and the upper end being suitably designed and appropriately padded to provide a comfortable head and face rest, whereby the fisherman may rest his head thereon while surveying and watching the under-ice fishing scene.

It is a further object of the invention to provide the shield on one side wall and intermediate the upper and lower ends with a folding seat, the latter characterized by a seat board hingedly mounted on said wall and a leg hingedly attached to the seat board, the two parts folding against the wall and being latched in place to render the over-all structure compact and convenient for storage and transportation.

In addition, it is an object of the invention to provide the wall opposite the seat with a hole or opening to accommodate the handle of a spear-type fork which is used for landing the catch, the preferred embodiment being that wherein the opening is formed in an outwardly and downwardly swingable door which permits access to be had to the interior of the shield to remove the catch.

Other objects, features and advantages will become more readily apparent from the following description and the accompanying sheet of drawing.

In the drawings:

Figure 1 is a section and elevation showing an under-ice viewing and fishing device, the manner which it is constructed and viewed, the view being partly in section and partly in elevation;

Figure 2 is an elevational view observing the shield in a direction from right to left with the fork removed;

Figure 3 is a top plan view; and

Figure 4 is a side elevational view showing the seat folded and the device ready for carrying or storage as the case may be.

Referring now to the drawings, the vision focusing shield may, of course, vary in construction. In its preferred form it is a light weight sheet material funnel-like member which has sometimes been referred to as a visor. It is made of any appropriate light weight material and is denoted generally by the numeral 6. Specifically, it is a truncated pyramidal shield and is open at its upper and lower ends. It comprises four walls 8, 10, 12 and 14 and it will be noticed that a major portion of the wall 12 is cut and formed into a panel 16 which is hinged in place at the lower end as at 18 and provides an outwardly and downwardly swingable door. This is provided at its upper end with a suitable handle or knob 20. Adjacent the upper free end there is a suitably shaped opening or hole 22 to accommodate the handle 24 of a pitchfork wherein the head 26 of the fork has barbed tines 27 forming an over-all implement which is sometimes called a spear. This is to assist in landing the fish after it is caught. A block or similar body 28 of sponge rubber or the like is fastened to the inside of the door and is lined up with the hole 22 and has a slit 30 therein which is expansible and contractible and serves to allow the handle 24 to be operated therethrough in the manner brought out in Fig. 1.

On the opposite wall 14 I provide seat means. This is a folding seat construction and comprises a suitable seat board 32 which has one end hingedly connected as at 34 with the intermediate portion of the wall 14. This is intended to place the seat when in use at the desired elevation above the surface of the ice 36 and below the level of the upper apical or truncated end. There is a second board provided and this is denoted at 38 and functions as a leg and is hingedly connected at 40 to the outer end portion 42 of the seat board. This leg folds in and against the wall 14 and between the seat board 32 in the manner shown in Fig. 4 when the device is to be transported or stored away. It may be stated in this connection that the numeral 44 designates an appropriate handle which is attached to the board adjacent the hinge 34 to permit carrying in the manner illustrated in Fig. 4. It is further to be noted that there is an eye screw 46 on the outer end of the board to accommodate a hook latch 48 pivoted on the bottom of the wall 14 as at 50. These details and their construction and arrangement will be evident from Fig. 4. In any event, when the seat is set up for use as shown in Fig. 1, the fisherman straddles the same so that he will be in a position to lean his head over and look down through the passageway provided by the shield 6. It is preferred that the shield be provided on the upper end with suitable headrest and cushioning means, this being characterized by an endless foam rubber collar or the like 52 which is appropriately attached and suitably shaped to allow the forehead, chin and head generally to rest thereon. This supports the head and face and allows the observer to peer down through the shield and through the hole 54 in the ice and observe the water 56 therebeneath and to handily manipulate the fishing line 58. The fishing line is shown baited as at 60.

The device is shown with the seat collapsed or folded and in out-of-the-way position in Fig. 4 for transportation and storage. Fig. 1 also shows the manner in which the spear is inserted and used and further shows, in phantom lines, the manner in which the door may be swung open to permit access to be had to the interior of the shield.

What is claimed as new is as follows:

1. A viewing and fishing device comprising a non-transparent truncated pyramidal shield open at its larger basal end and constantly open at its upper restricted end, said basal end being adapted to encompass said hole and rest firmly atop the ice surrounding and in alignment with said hole, said upper end being restricted so that a fishing line may be passed therethrough and suspended in the water via said hole and so that the fisherman may conveniently peer down through the shield with requisite vigilance and be thus alerted to make a desired catch.

2. The structure defined in claim 1 and the combination therewith of seat means attached to and disposed exteriorly of said shield, said seat means being at a level relative to the ice and the over-all vertical height of the shield so that the fisherman may sit comfortably thereon, lean over and rest his head on and over said upper end and focus his eyes on said hole and the under-ice fishing area.

3. The structure defined in claim 2 and the combination therewith of a padded head and face rest attached to and encircling said upper end.

4. A viewing and fishing device for use in fishing through a hole in the ice of ice covered water comprising a non-transparent truncated pyramidal shield open at its larger basal end and constantly open at its upper restricted end, said basal end being adapted to encompass said hole and rest firmly atop the ice surrounding and in alignment with said hole, said upper end being restricted so that a fishing line may be passed therethrough and suspended in the water by way of said hole and so that the user may conveniently peer down through the shield with requisite vigilance and be thus alerted to make a desired catch, a seat board hingedly mounted at one end on the intermediate portion of one wall of said shield, and a supporting leg hingedly fastened at one end to the other end of said seat board.

5. For use when fishing through a hole in the ice in ice-covered water, a viewing and fish sighting shield open at upper and lower ends, said lower end adapted to encompass said hole and rest firmly atop the ice surrounding and in alignment with said hole, said upper end being restricted so that a fishing line may be passed therethrough and suspended in the water by way of said hole and so that the fisherman may conveniently peer down through the shield with requisite vigilance and be thus alerted to make a desired catch, and seat means attached to and disposed exteriorly of said shield, said seat means being at a level relative to the ice and the over-all vertical height of the shield so that the fisherman may sit comfortably thereon, lean over and rest his head on and over said upper end and focus his eyes on said hole and the under-ice fishing area.

6. The structure defined in claim 5 and the combination therewith of a cushioned collar-like pad attached to and encircling said upper end and functioning as a head and face rest, whereby the fisherman may rest his head thereon.

7. A viewing and fishing device for use in fishing through a hole in the ice of ice covered water comprising a portable light weight easy-to-carry non-transparent truncated pyramidal shield open at its larger basal end and constantly open at its upper restricted end, said basal end being adapted to encompass said hole and rest firmly atop the ice surrounding and in alignment with said hole, said upper end being restricted so that a fishing line may be passed therethrough and suspended in the water by way of said hole and so that a user may conveniently peer down through the shield and be thus alerted to make a desired catch, and seat means attached to and disposed exteriorly of said shield, said seat means being at a level relative to the ice and the over-all vertical height of the shield so that said user may sit comfortably thereon, lean over and rest his head on and over said upper end and focus his eyes on said hole and the under-ice fishing area.

8. The structure defined in claim 7 and the combination therewith of a padded head and face rest attached to and encircling said upper end.

9. A viewing and fishing device for use in fishing through a hole in the ice of ice covered water comprising a portable light weight easy-to-carry non-transparent truncated pyramidal shield open at its larger basal end and constantly open at its upper restricted end, said basal end being adapted to encompass said hole and rest firmly atop the ice surrounding and in alignment with said hole, said upper end being restricted so that a fishing line may be passed therethrough and suspended in the water by way of said hole and so that a user may conveniently peer down through the shield and be thus alerted to make a desired catch, a seat board having one end hingedly mounted on an intermediate portion of one wall of said shield, a leg hingedly attached to the other end of said seat board, the two parts being foldable together and foldable as a unit against said wall for convenient storage and transportation, a carrying handle carried by said seat board, the wall opposite said first named wall having a downwardly and outwardly swinging hingedly mounted door.

10. The structure specified in claim 9 and wherein the upper portion of said door is provided with an opening to accommodate the handle portion of a fish spearing fork, said door being within the reach and operable from the seat occupied by the fisherman and the opening in said door being at a level which is suitably accessible while the fisherman is seated on said seat board.

References Cited in the file of this patent

UNITED STATES PATENTS

| | | |
|---|---|---|
| 1,031,851 | January | July 9, 1912 |
| 1,451,096 | Hagen | Apr. 10, 1923 |
| 2,404,556 | Wirth | July 23, 1946 |
| 2,466,496 | Smith | Apr. 5, 1949 |
| 2,546,588 | Ellis | Mar. 27, 1951 |